United States Patent
Disser et al.

(10) Patent No.: US 6,262,544 B1
(45) Date of Patent: Jul. 17, 2001

(54) FOUR QUADRANT MOTOR OPERATION USING DC BUS CURRENT SENSING

(75) Inventors: Robert John Disser, Dayton; Bruce Allen Heaston, West Milton, both of OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/514,729

(22) Filed: Feb. 28, 2000

(51) Int. Cl.[7] .................................. G05B 5/01; H02P 5/40
(52) U.S. Cl. ........................ 318/245; 318/138; 318/254; 318/439
(58) Field of Search .................................. 318/138, 245, 318/254, 280–293, 439, 139, 590, 560, 561, 362; 360/45, 51, 65

(56) References Cited

U.S. PATENT DOCUMENTS

| | | | |
|---|---|---|---|
| 4,399,395 | * | 8/1983 | Espelage . |
| 4,972,186 | * | 11/1990 | Morris . |
| 5,204,594 | * | 4/1993 | Carobolante . |
| 5,541,484 | * | 7/1996 | DiTucci . |
| 5,789,895 | * | 8/1998 | Lee . |
| 5,793,180 | * | 8/1998 | Maiocchi et al. . |
| 5,838,128 | * | 11/1998 | Maiocchi et al. . |
| 5,859,520 | * | 1/1999 | Bourgeois et al. . |
| 6,028,402 | * | 2/2000 | Kumar et al. . |
| 6,124,992 | * | 9/2000 | Pham . |
| 6,163,120 | * | 12/2000 | Menegoli . |

* cited by examiner

Primary Examiner—Paul Ip
(74) Attorney, Agent, or Firm—Robert M. Sigler

(57) ABSTRACT

A method of operating a four quadrant motor involves (a) monitoring a motor voltage magnitude request signal which varies between zero and a maximum value and (b) monitoring a motor direction request input. In step (c), based upon the request signal and input monitored in steps (a) and (b), a voltage request reference signal is established. In a step (d) a current magnitude request signal is monitored and in a step (e) a first current request reference signal and a second current request reference signal are established based upon the signal monitored in step (d). In a step (f) a voltage across a current sense resistor of a bus connected for powering the motor is monitored and in a step (g) a sense resistor reference signal is established based upon the signal monitored in step (f). In a step (h) the first current request reference signal is compared with a feedback current signal and in a step (i) the second current request reference signal is also compared with the feedback current signal. In a step (j) the sense resistor reference signal is provided to a controllable amplifier and in a step (k) a positive/negative gain of the controllable amplifier is controlled based upon the voltage request reference signal, the comparison made in step (h) and the comparison made in step (i). In a step (l) a signal output of the controllable amplifier is sampled to generate the current feedback signal which represents an actual current of the four quadrant motor.

8 Claims, 9 Drawing Sheets

FOUR QUADRANT MOTOR OPERATION USING DC BUS CURRENT SENSING

TECHNICAL FIELD

The present invention relates to four quadrant motor operation, and more particularly, to a circuit and associated method for recreating actual motor current from sensed bus current information.

BACKGROUND OF THE INVENTION

Prior art of brush motor control circuits can be divided into three general categories: one quadrant operation, two quadrant operation, and four quadrant operation.

One quadrant motor operation basically describes unidirectional motor operation. This operation uses a single power device as a switch which may be operated in an on/off mode or in a pulse-width-modulated (PWM) mode. When this switch is used in a PWM mode, a free wheeling diode is used to recirculate the motor current when the power device is in the off mode. This mode of operation usually does not provide a motor braking function. Current sensing for this operation is generally done using a sensor in the DC bus which provides power device current but not actual motor current.

Two quadrant motor operation is characterized by motoring or plugging in a forward direction, motoring or plugging in a reverse direction, and braking in either direction. This operation uses four power switching devices and four free wheeling diodes in parallel with these switching devices in what is commonly referred to as an "H" bridge configuration. This mode of operation also provides bi-directional operation of the motor to provide torque to a load or actuator, and provides the ability to "plug" the motor. Plugging involves rapidly reversing the applied motor voltage while the motor continues to rotate in the opposite direction due to a previously applied motor voltage. This action results in the potential occurrence of uncontrolled motor currents and power device currents equal to twice the stall current of the motor. Finally, this mode of operation provides the ability to "brake" the motor. Braking involves turning on both upper or both lower power devices in the "H" bridge simultaneously while the motor is rotating in either direction. This action results in the potential occurrence of uncontrolled motor currents and power device currents equal to the stall current of the motor. Current sensing for this operation is generally done using a sensor in the DC bus which provides power device current but not actual motor current. This method of current sensing does not provide information to indicate actual motor current information.

Four quadrant motor operation is characterized by motoring in a forward direction, regenerating in a forward direction, motoring in a reverse direction, regenerating in a reverse direction, and braking without uncontrolled motor currents. This operation uses four power switching devices and four free wheeling diodes in parallel with these switching devices in the "H" bridge configuration. This mode of operation provides bi-directional operation of the motor to provide torque to a load or actuator and absorb torque from a load or actuator. In providing torque to the load, the motor operates in a motoring mode in either direction with controlled motor currents. In absorbing torque from the load, the motor operates in a regenerating mode in either direction with controlled motor currents. Four quadrant motor operation generally does not provide a "plug" capability in order to avoid the uncontrolled motor currents. Finally, this mode of operation provides the ability to "brake" the motor, but it monitors motor current to avoid the uncontrolled braking currents. Current sensing for this operation has previously been done using a sensor in series with the motor leads to provide actual motor current. To provide four quadrant operation, actual motor current is required so that current direction information is retained.

Two quadrant motor operation as described above has the advantage of easy and low cost current sensing but has the disadvantage of uncontrolled motor currents and power device currents in several modes of operation. The uncontrolled currents may result in catastrophic damage to the controlling power devices. The typical solution to protecting the power devices is to oversize the power devices to handle the uncontrolled currents. However, an uncontrolled overcurrent condition can also cause demagnetization of the motor magnets. Four quadrant motor operation as described above has the advantage that there are no modes of operation in which the motor currents are uncontrolled but has the disadvantage that motor current sensing is more expensive and more cumbersome. The advantage of controlled currents is that the motor torque is always at a known level and the power devices remain within their safe operating area (SOA).

Accordingly, it would be desirable and advantageous to provide four quadrant motor operation without requiring the use of a current sensor in series with the motor leads.

SUMMARY OF THE INVENTION

In one aspect of the present invention, a method of operating a four quadrant motor involves (a) monitoring a motor voltage magnitude request signal which varies between zero and a maximum value and (b) monitoring a motor direction request input. In step (c), based upon the request signal and input monitored in steps (a) and (b), a voltage request reference signal is established. In a step (d) a current magnitude request signal is monitored and in a step (e) a first current request reference signal and a second current request reference signal are established based upon the signal monitored in step (d). In a step (f) a voltage across a current sense resistor of a bus connected for powering the motor is monitored and in a step (g) a sense resistor reference signal is established based upon the signal monitored in step (f). In a step (h) the first current request reference signal is compared with a feedback current signal and in a step (i) the second current request reference signal is also compared with the feedback current signal. In a step (j) the sense resistor reference signal is provided to a controllable amplifier and in a step (k) a positive/negative gain of the controllable amplifier is controlled based upon the voltage request reference signal, the comparison made in step (h) and the comparison made in step (i). In a step (l) a signal output of the controllable amplifier is sampled to generate the current feedback signal which represents an actual current of the four quadrant motor.

This invention allows the motor to operate in a controlled torque manner at all times and allows the power devices to be properly sized. Since a single bus current sensor is used instead of a motor current sensor, the improved operation is provided at nearly the cost of two quadrant operation. Actual motor current is recreated using bus current information. Actual motor current is required for four quadrant motor operation so that motor current direction is preserved. Recreating this information using a bus current sensor provides the required information at a cost similar to the methods used which do not retain the motor current direction information. Elimination of uncontrolled currents also eliminates periods of uncontrolled torque in the motor operation. This is more important as systems become more "servo quality" oriented. Also, elimination of uncontrolled currents allows power devices to be properly sized which may also lead to additional cost savings. In systems with higher voltages than present automotive voltages, this may be the difference between a functional system and inability to properly provide a required function.

DESCRIPTION OF THE PREFERRED EMBODIMENT

Four quadrant motor operation may be defined as four distinct operating conditions determined by the motor rotational direction and motor current (torque) directions. The four operating conditions are simply defined as motoring in the forward direction with torque in the forward direction, motoring in the reverse direction with torque in the reverse direction, regeneration in the forward rotational direction with torque in the reverse direction, and regeneration in the reverse rotational direction with torque in the forward direction. Both of the motoring operating conditions remove power from the electrical supply and apply mechanical energy to a load. Both of the regeneration operating conditions remove mechanical energy from a load and return the power to the electrical supply.

Figure 1:
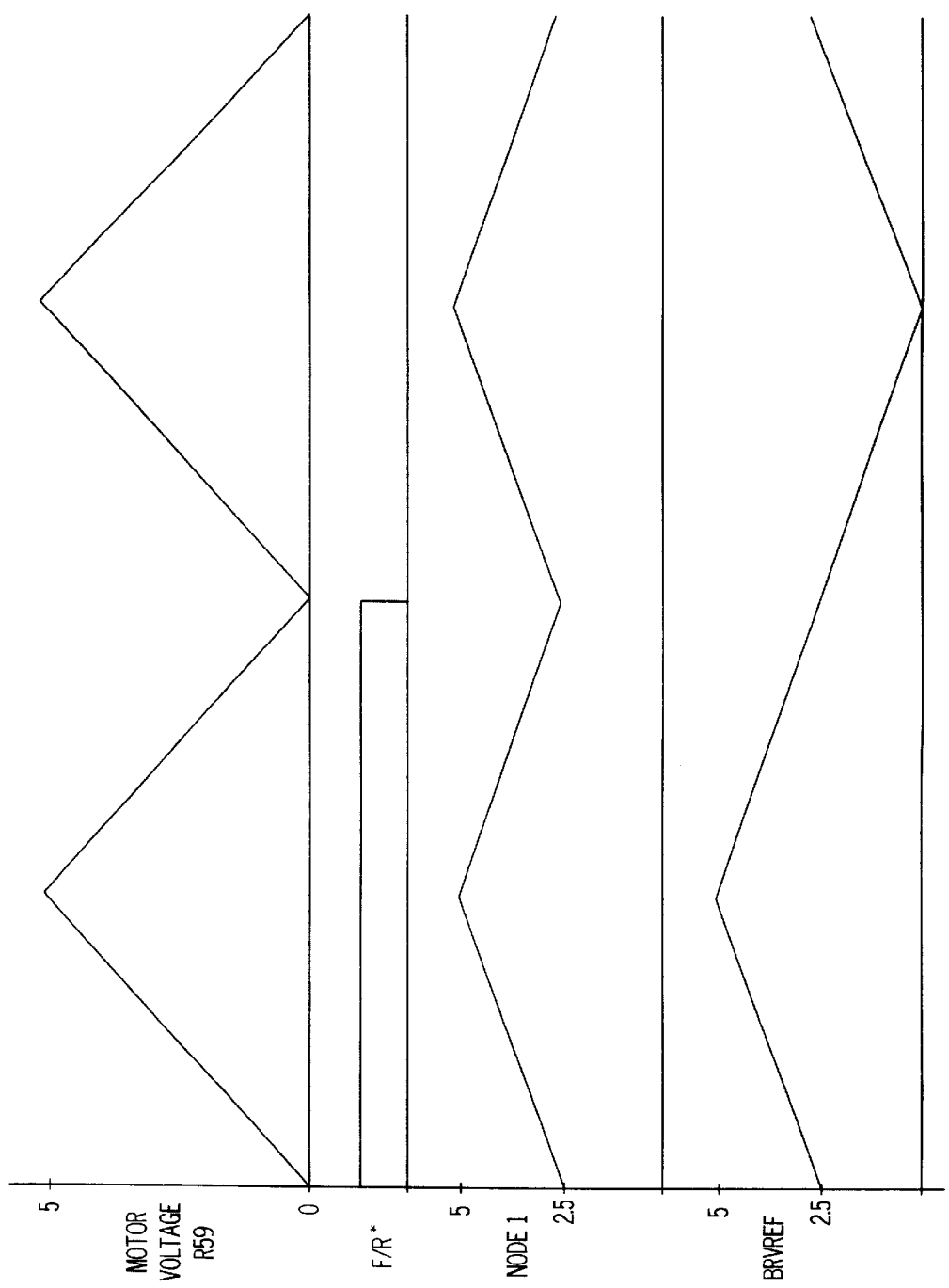
FIG. 1 illustrates signals associated with a motor control circuit in accordance with one embodiment of the invention.

To facilitate implementation of this invention, several operating parameters are defined. The user will input motor operation requests (FIGS. 1 and 2) as a motor voltage magnitude, a motor current magnitude, a motor direction, and a motor enable. In the illustrated embodiment, the user motor voltage request is a 0 to 5 volt signal which represents 0 to 100% duty cycle while motor current request input is a 0 to 2.5 volt signal which represents a 0 to maximum current. The motor direction and motor enable signals are digital signals with values of either 0 volts or maximum voltage (one is supplied by +5V and one is supplied by the Vcc voltage). Conditioning circuitry converts these inputs to a set of signals which makes implementation easier. All motor voltage and current requests are converted such that a zero command is represented by reference of 2.5 volts. The motor voltage magnitude and direction are converted such that above 2.5 volts represents a positive motor voltage request (with 5 volts being maximum positive request) and below 2.5 volts represents a negative motor voltage request (with 0 volts being maximum negative request). FIG. 1 shows a graph of the user motor voltage request, direction request (F/R*), and the internal motor voltage reference signal (BRVREF) as they are ramped from zero to maximum positive back through zero to maximum negative and back to zero.

Figure 2:
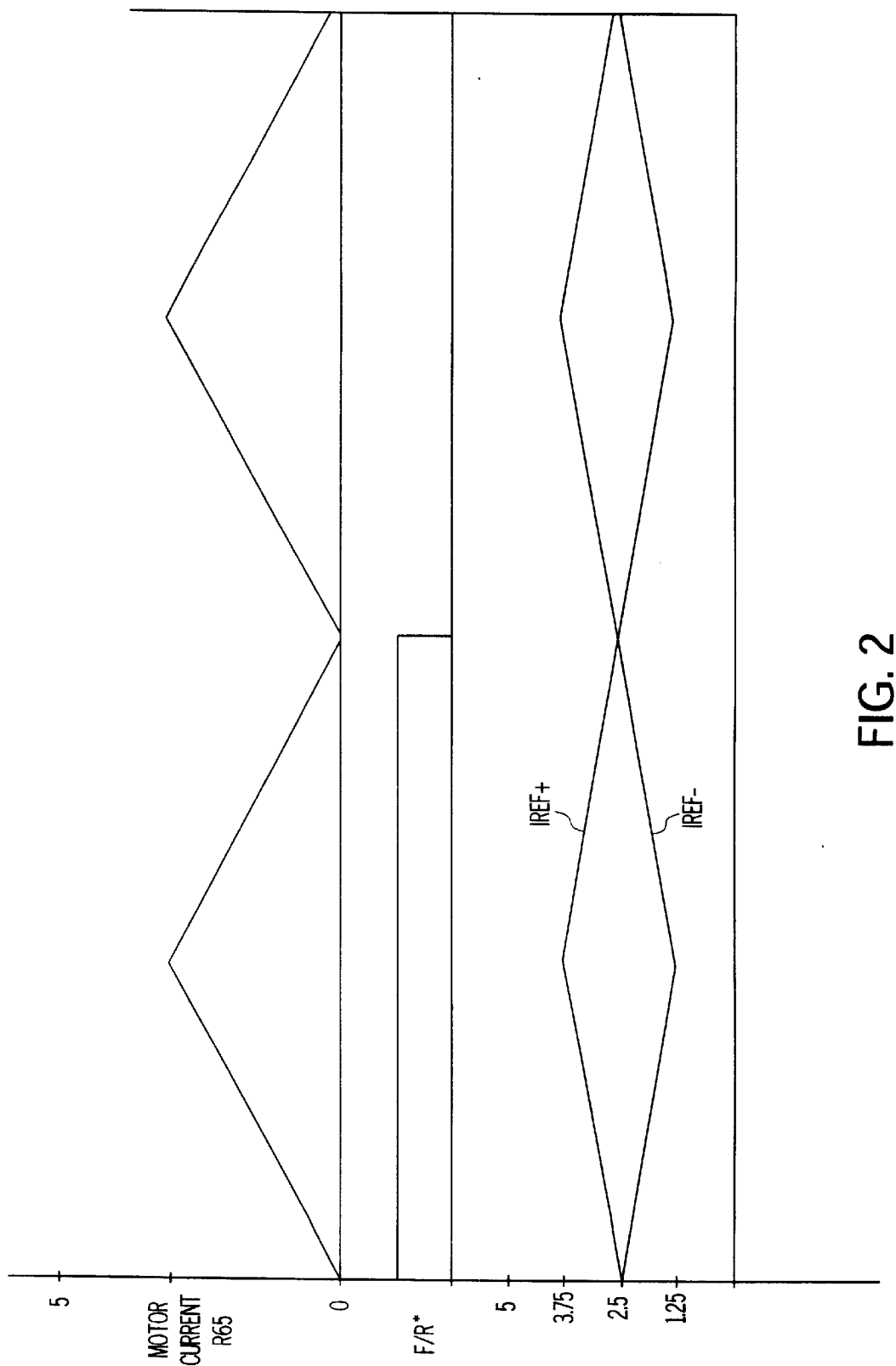
FIG. 2 illustrates signals associated with a motor control circuit in accordance with one embodiment of the invention.

The motor current magnitude is converted such that two signals result: IREF+ and IREF−. Zero is represented when both signals are at 2.5 volts. As the user current magnitude increases, these signals diverge from 2.5 volts such that IREF+ approaches 3.75 volts and IREF− approaches 1.25 volts. FIG. 2 shows a graph of user motor current request, IREF+, and IREF+ as they are ramped from zero to max. Motor current direction is handled by creating the two signals and is required because motor current can be positive while the motor rotational direction can be forward or reverse.

Figure 3:
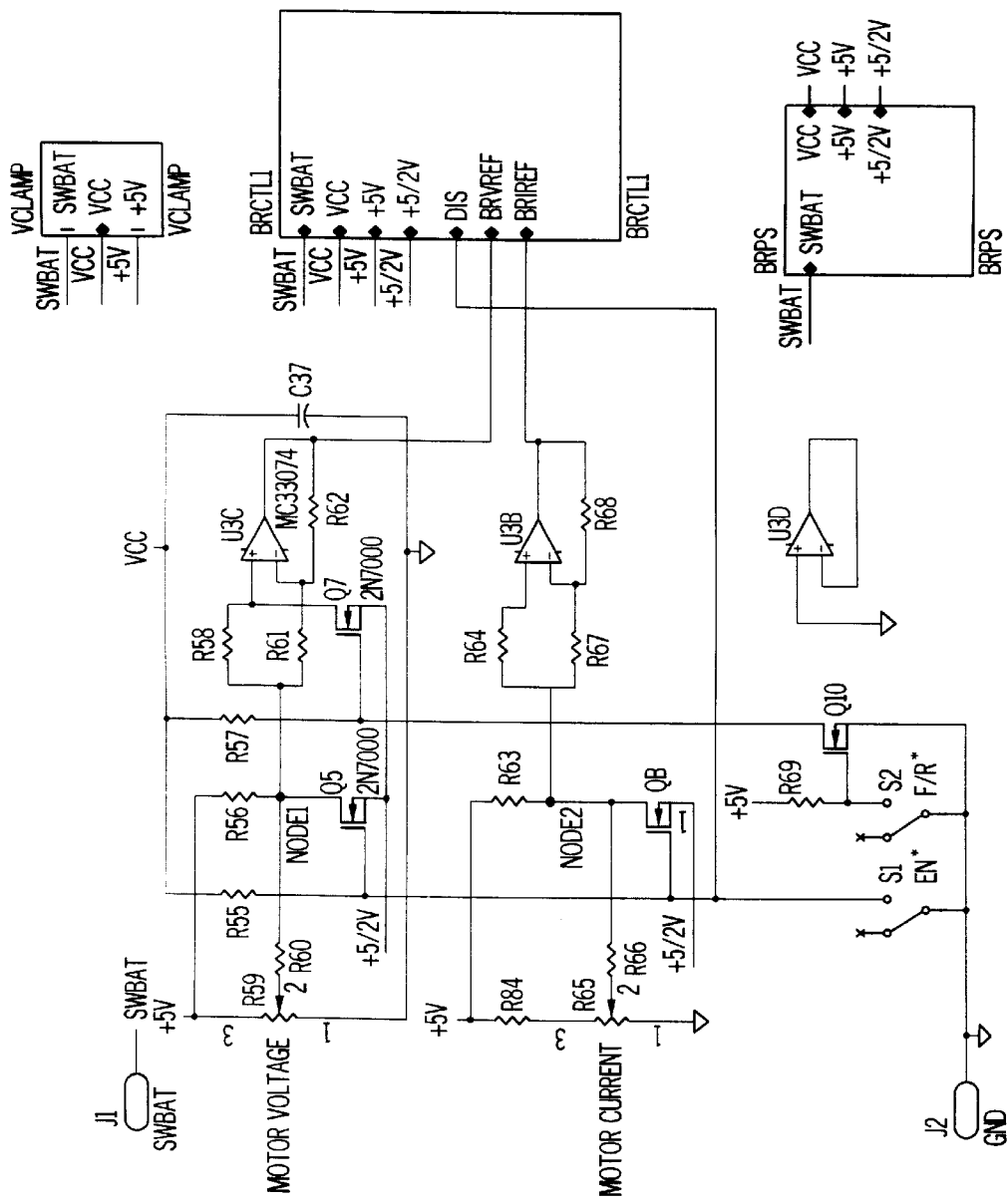
FIG. 3 illustrates a schematic of a motor control input circuit according to one embodiment of the invention.

Referring to FIG. 3, the motor control elements are switch S1, switch S2, potentiometer R59, and potentiometer R65. Switch S1 is the enable switch. When switch S1 is open (off or disabled position), Q6 and Q8 are on holding the motor voltage and motor current requests at zero (2.5 volts). Also, the output driver is held in the off condition. When switch S1 is closed (on or enabled position), the motor voltage and motor currents are allowed to be non-zero and the output driver is enabled.

Switch S2 is the direction switch. When switch S2 is closed, the motor is in the reverse direction and when the switch is open the motor is in the forward direction. The functionality of switch S2 becomes significant to the invention in that switch S2 allows additional circuitry to set up motor voltage request references. This concept will be explained after the two potentiometers are described.

Potentiometer R59 establishes the motor voltage request input. This motor voltage request signal ranges from 0 volts to 5 volts. This signal actually translates into a motor PWM duty cycle where 0 volts represents 0% duty cycle and 5 volts represents 100% duty cycle. Potentiometer R59 is used in conjunction with the direction switch S2, to determine if a positive or a negative voltage is sent to the motor. Refer to FIG. 1 and FIG. 3, resistors R56 and R60 form a voltage divider such that the voltage at node 1 ranges from 2.5 V to 5 V as the potentiometer voltage ranges from 0V to 5 V. Amplifier U3C along with resistors R58, R61, and R62 and transistor Q7 form a "+1/−1" amplifier. With the F/R* switch S2 in the forward position (open), Q10 is conducting and Q7 is biased off. Under this condition, amplifier U3C operates with a gain of +1 (unity gain follower) and the output of amplifier U3C follows the voltage at node 1 to generate the first half of the output graph (BRVREF) shown in FIG. 1. With the F/R* switch S2 in the reverse position (closed), Q10 is biased off and Q7 is conducting to short the +input of U3C to 2.5 volts. Under this condition, amplifier U3C operates with a gain of −1 and the output of amplifier U3C inverts the voltage at node 1 to generate the second half of the output graph (BRVREF) shown in FIG. 1. The output of amplifier U3C becomes the motor voltage (duty cycle) request reference signal which is used internal to this circuit.

Potentiometer R65 establishes the motor current request input. This request signal ranges from 0 volts to 2.5 volts and represents a current limit request of 0 amps to 25 amps. The 25 amp upper limit may be scaled to a maximum number based upon motor size and application requirement. Referring to FIG. 2 and FIG. 3, resistors R63 and R66 form a voltage divider such that the voltage at node 2 ranges from 2.5 volts to 3.75 volts as the potentiometer voltage ranges from 0 volts to 2.5 volts. Amplifier U3B along with resistors R64, R67, and R68 operate as a unity gain follower since there is no transistor present to provide a function similar to that of Q7. The output of amplifier U3B becomes the positive motor current request reference signal (IREF+) which is used internal to this circuit. Internal to functional block BRCTL1 a unity gain inverting amplifier (pins 15, 16, and 17 of U7 on FIG. 7) multiples the signal (IREF+) by a gain of −1 to create a negative motor current request reference signal (IREF−) which is used internal to this circuit. Together, these current request reference signals form a current limit reference pair which limits the motor current to this requested limit independent of which of the 4 quadrants the motor is operating. In particular, signal (IREF+) is the positive current limit which ranges from 2.5 volts to 3.75 volts where 3.75 volts is the maximum positive current limit, and signal (IREF−) is the negative current limit ranging from 2.5 volts to 1.25 volts where 1.25 volts is the maximum negative current limit.

Figure 4A:
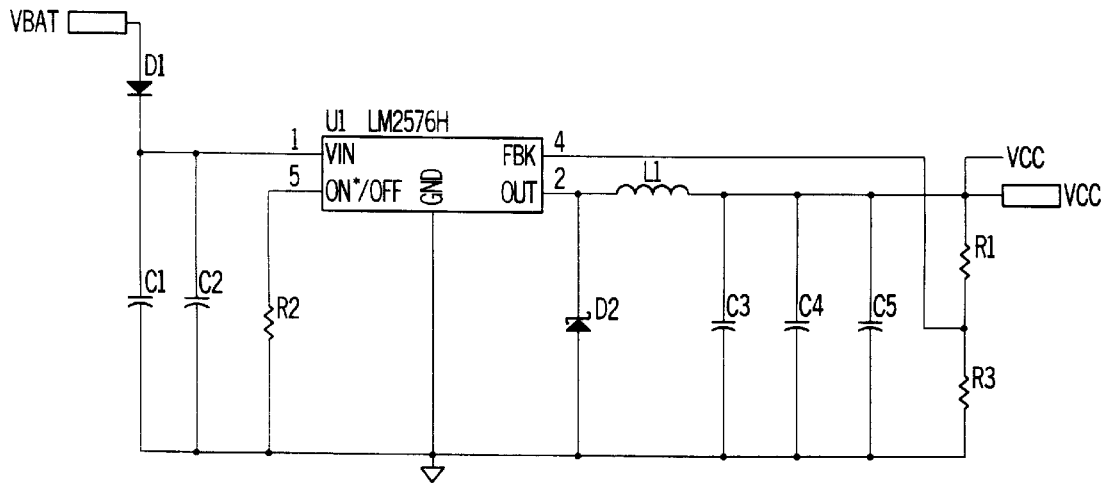
FIG. 4 illustrates a power supply circuit according to one embodiment of the invention.
Figure 4B:
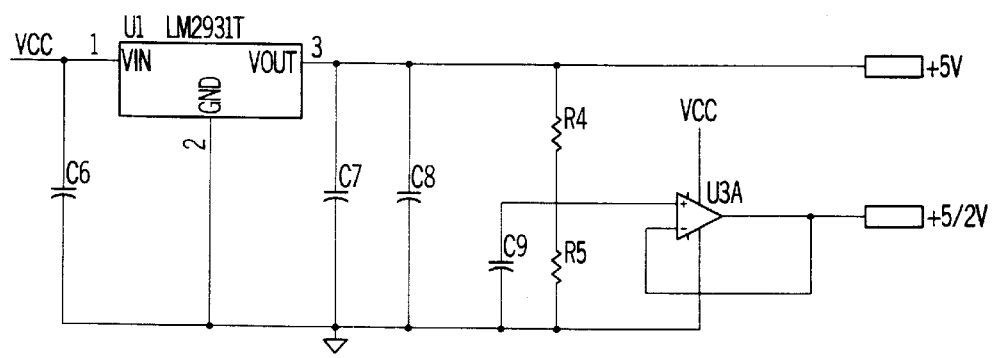

FIGS. 4A and 4B illustrate the power supply circuit design. U1 provides the regulated voltage VCC for the circuit. This voltage is a filtered battery voltage which is clamped and regulated at 15 volts if the battery voltage rises above 15 volts. U2 is a 5 volt regulator which provides the 5 volt reference for the control circuitry. Resistors R4 and R5 are a voltage divider which is buffered by amplifier U3A which operates as a unity gain buffer. This provides the +2.5 volt reference for the control circuitry which defines the voltage level of the 0% duty cycle request and the 0 current magnitude request.

Figure 5:
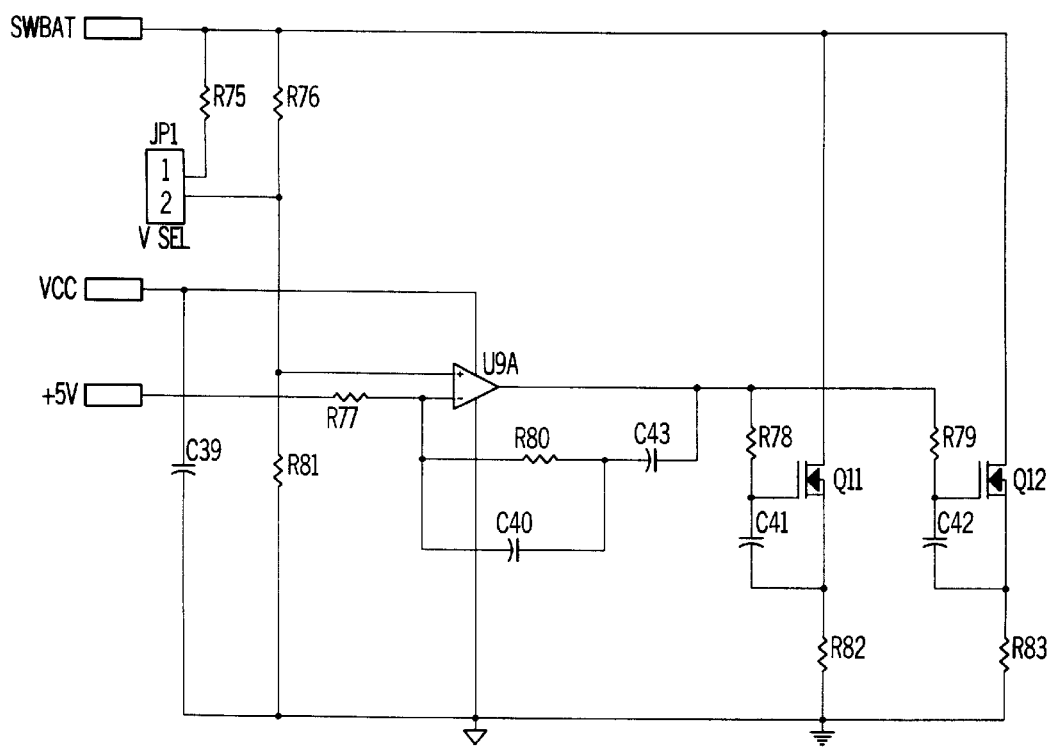
FIG. 5 illustrates an over voltage clamp circuit according to one embodiment of the invention.

FIG. 5 illustrates the design of an over voltage clamp for the SWBAT voltage which is the main power supply to the motor driver "H" bridge. This circuitry is required because this invention provides the capability to regenerate energy back to the power supply. Since most standard power supplies do not have significant capability to absorb regenerated energy, this design requires additional hardware to absorb energy to protect devices from over voltage situations. In the standard automotive vehicle, the vehicle battery will absorb regenerated energy and this portion of the circuit design is not required.

Figure 6:
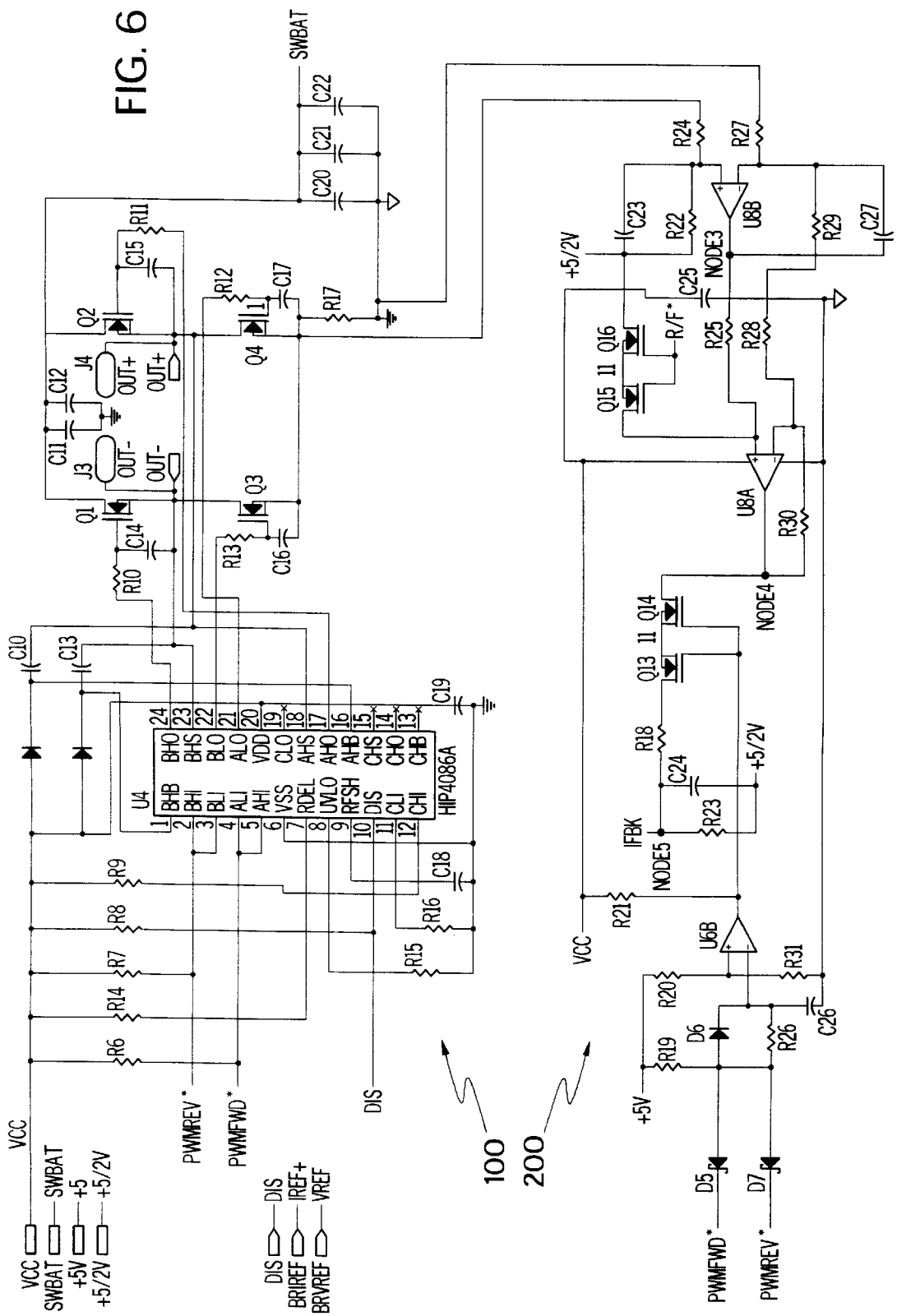
FIG. 6 illustrates power device interface circuitry and motor current recreation circuitry according to one embodiment of the invention.
Figure 7:
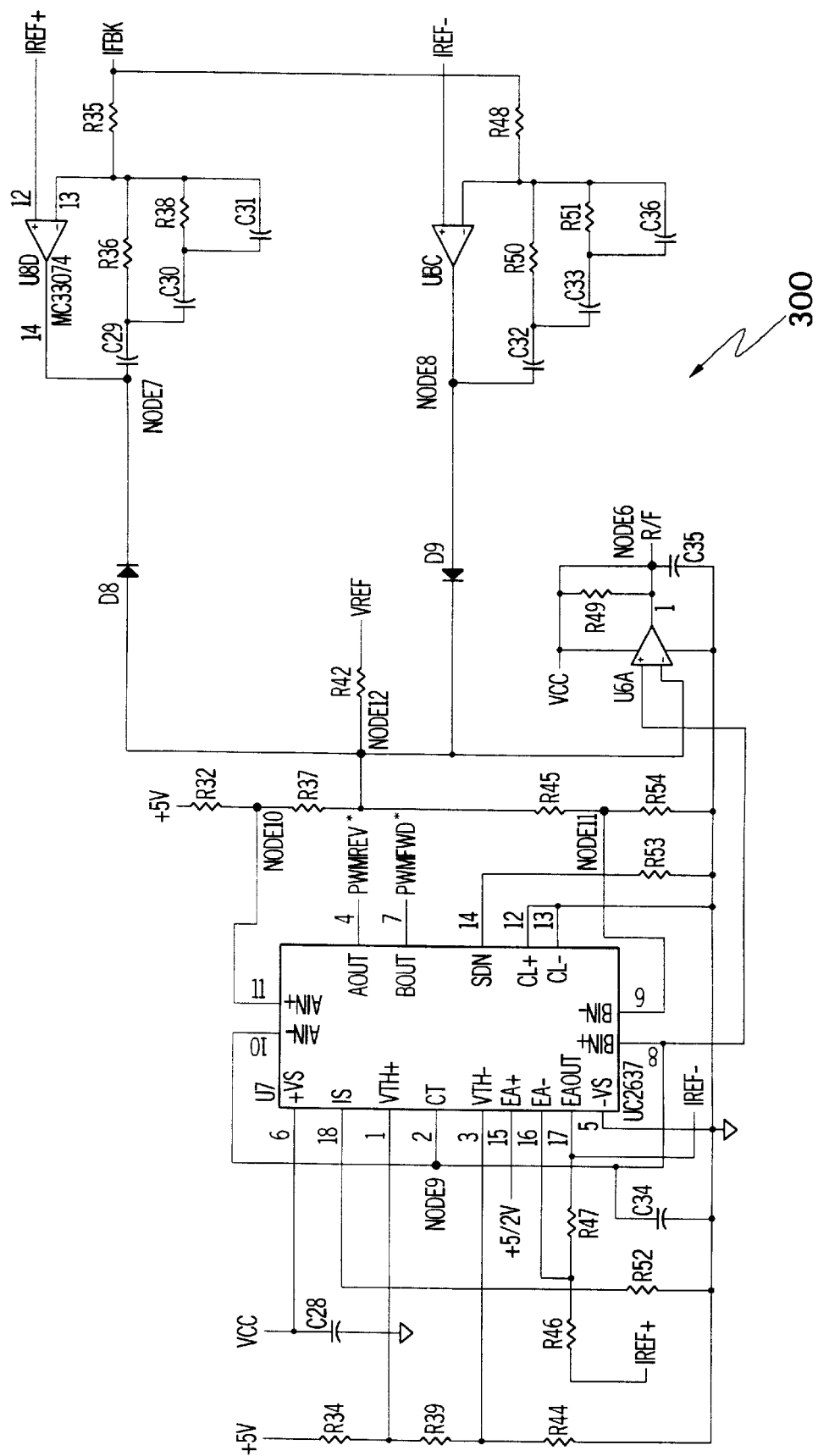
FIG. 7 illustrates current control circuitry and PWM signal generation circuitry according to one embodiment of the invention.

FIGS. 6 and 7 illustrate one embodiment of the motor control logic and power devices which provide the novelty to this invention. Three main sections are shown, the power devices and interface 100, the motor current recreation circuitry 200, and the current control and PWM generation 300.

The power devices and interface 100 include transistors Q1, Q2, Q3, and Q4 which represent the power transistors that are arranged in a traditional "H" bridge configuration. Each of these transistors has an associated gate resistor and gate capacitor which his also typical of prior art. Capacitors C20, C21, and C22 act as the bus filter capacitors. Resistor R17 is the current sensing resistor for current control. The integrated circuit U4 is the gate drive interface device, and may be an HIP4086A. It translates logic level input signals on the left side of the IC to higher voltage gate drive outputs. Diodes D3 and D4, and capacitors C10 and C13 are used in a boot strap configuration to provide the upper gate drive supply voltage. Resistors R6, R7, R8, R9, R14, R15, R16, and capacitor C18 are used to properly bias U4 and provide some operational timing characteristics. Connecting pin 2 to pin 3 and pin 4 to pin 5 forces each half of the "H" bridge to operate as complementary pairs. That is to say, when Q1 is on, Q3 is off, and when Q3 is on, Q1 is off. Likewise, when Q2 is on, Q4 is off, and when Q4 is on, Q2 is off. Although this is not a requirement for this invention, this complementary operation simplifies the logic necessary to provide 4 quadrant motor operation. All of the following explanation assumes that the complementary operation is the preferred embodiment of this invention.

Figure 8:
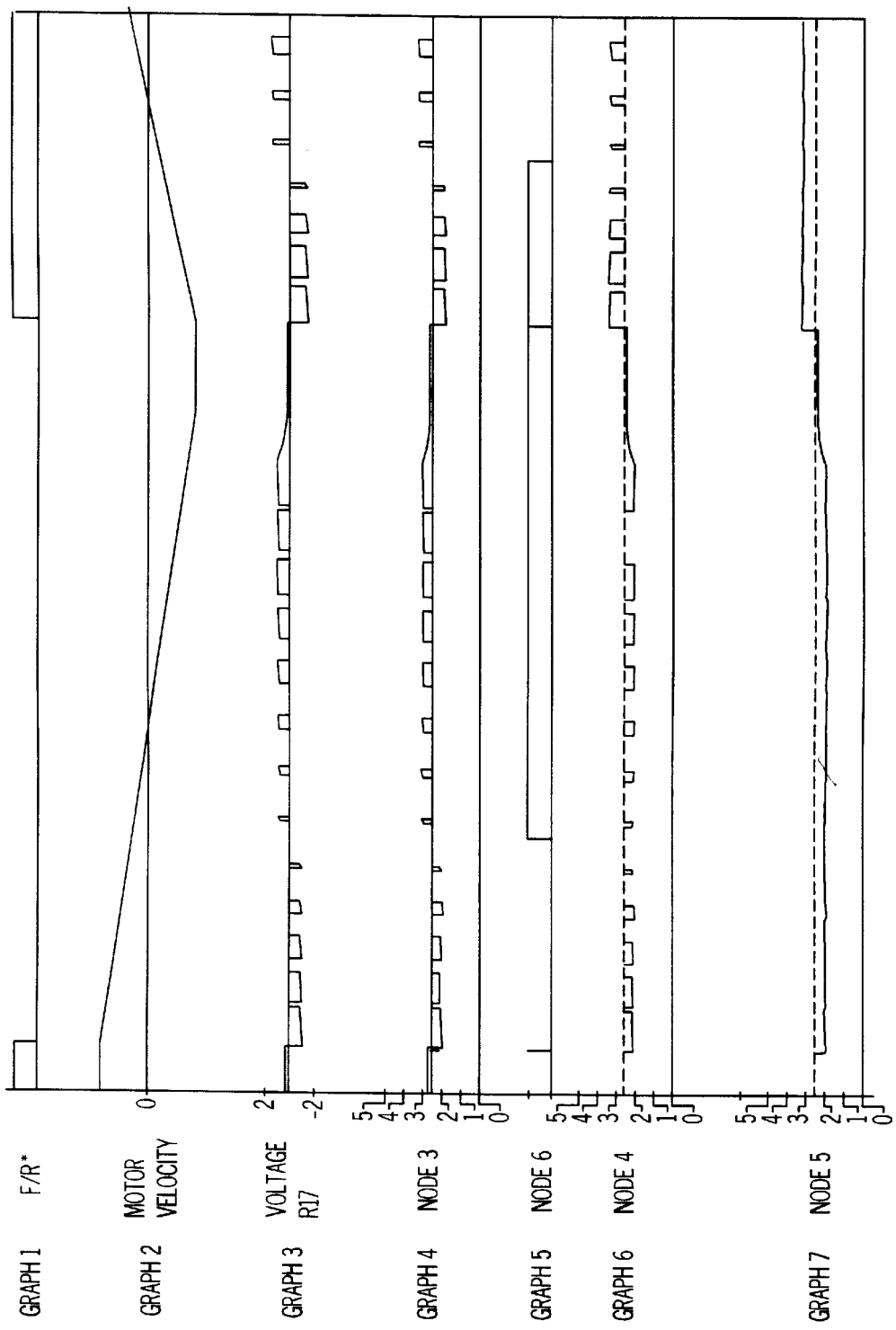
FIG. 8 illustrates signals associated with the circuitry depicted in FIGS. 3, 5, 6 and 7.

The motor current recreation circuitry is now described with reference to FIGS. 6, 7 and 8. The graphs in FIG. 8 are representative drawings instead of actual data so that the graphs appear cleaner and the PWM information can be illustrated. The first graph in FIG. 8 shows the state of the F/R* (forward/reverse) switch signal where the forward direction request is illustrated by a high voltage and the reverse direction request is illustrated by a low voltage. The second graph in FIG. 8 represents the motor velocity as would be represented by a tachometer with voltage above zero representing positive velocity and voltage below zero representing negative velocity. These first two graphs illustrate a motor running at a fixed positive velocity, decelerating through zero velocity, accelerating to a fixed negative velocity, decelerating through zero, and, finally, accelerating in a positive direction. The linear acceleration and deceleration indicate a constant current limit while accelerating and decelerating which indicates the benefit of 4 quadrant operation.

The third graph of FIG. 8 represents the voltage signal across R17 which is the current sense resistor in the DC bus. Note that the voltage across R17 is negative immediately after the F/R* signal changes. However, the first negative voltage represents a deceleration from a positive velocity, and the second negative voltage represents a deceleration from a negative velocity. These negative voltages across the bus current sense resistor contain no information about motor rotational direction or current direction, but they do indicate motor operation in a regenerative quadrant. The forth graph which represents node 3 of FIG. 6 is an amplified and offset representation of the voltage across R17. The amplification offers improved resolution due to the use of a differential amplifier U8B. The offset to zero current represented by a 2.5 volt signal allows the signal to be in the active range for amplifiers while recreating motor current signals which represent a regenerative motor current. A negative signal across R17 is represented by a voltage below 2.5 volts at the node 3 signal.

The next two graphs of FIG. 8 are the key to motor current recreation using a bus current sensor. The graph at node 6 is generated in the motor control section 300 and will be further explained below. This node 6 signal indicates when the current signal at node 3 needs to be multiplied by a gain of one and when it needs to be multiplied by a gain of minus one. When the signal at node 6 is high, the signal at node 3 needs to be multiplied by negative one. This occurs when the motor current is negative and producing negative torque or when the motor current is driven positive due to regeneration while the motor velocity is still negative. The first situation occurs as the motor velocity decelerates toward zero and accelerates in the negative direction. The signal at node 6 goes to a high which causes the signal at node 3 to be multiplied by a gain of minus one by amplifier U8A such that the signal at node 4 is inverted at this point. The second situation occurs as the motor velocity begins to decelerate from a steady negative velocity which actually causes a positive regenerated motor current providing a positive torque to decelerate the motor. The regenerated current appears negative across R17 and at node 3 because it is a regenerative current, but the node 6 signal indicates a gain of minus one, and the signal at node 4 indicates that this is truly a positive motor current. The signal at node 4 is essentially the recreated motor current modulated by the PWM of the control circuit. Transistors Q15 and Q16, and capacitor C24 acts as a sample and hold to recreate the complete, actual motor current signal. The timing of the sample and hold circuit is controlled by comparator U6B and the output is shown in the node 5 of FIG. 8. This graph has been found to compare favorably with a current probe placed in series with the actual motor wires.

Figure 9:
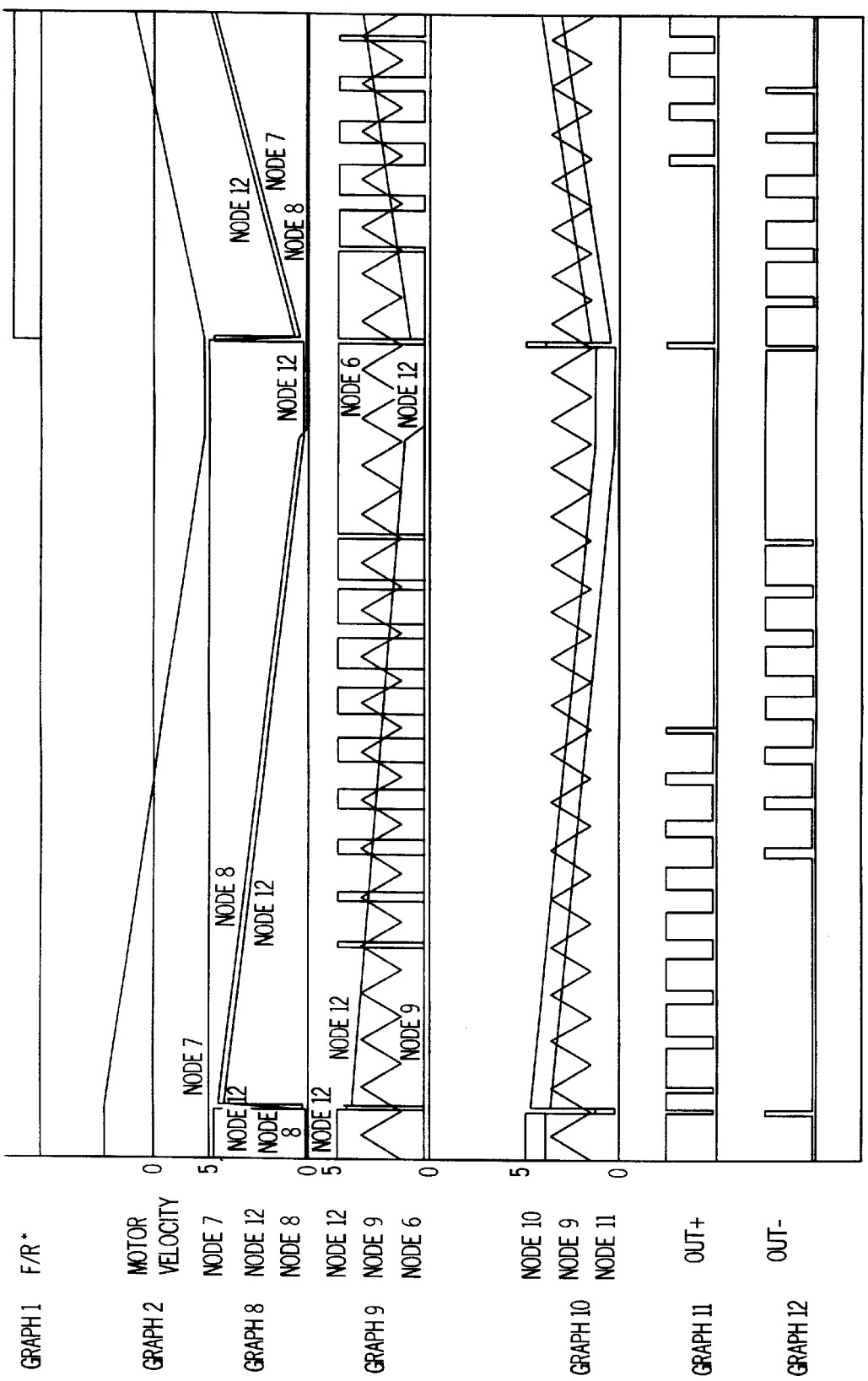
FIG. 9 illustrates additional signals associated with the circuitry depicted in FIGS. 3, 5, 6 and 7.

The motor control and PWM generation circuitry 300 is shown in FIG. 7. Reference is made to FIGS. 6, 7 and 9 to assist with the following description. The graphs in FIG. 9 are representative drawings instead of actual data so that the graphs appear cleaner and the PWM information can be illustrated. Graph 1 in FIG. 9 shows the state of the F/R* (forward/reverse) and graph 2 represents the motor velocity similar to FIG. 8. These first two graphs illustrate a motor running at a fixed positive velocity, decelerating through zero velocity, accelerating to a fixed negative velocity, decelerating through zero, and, finally, accelerating in a positive direction.

Graph 8 in FIG. 9 illustrates node 7, node 8, and node 12 of circuit 300. Node 12 actually controls the PWM generation by IC U7 and is controlled by three factors: the voltage request from VREF, a positive current limit request, and a negative current limit request (the actual PWM generation is explained in the following graphs). Node 7 is the positive current limit control which results from an over current condition when the motor is providing positive torque while rotating with positive (forward) velocity (motoring in the forward direction) or when the motor is providing positive torque while rotating with negative (reverse) velocity (regenerating in the reverse direction). Node 7 overrides the voltage request from VREF by pulling node 12 lower via diode D8. The signal level at node 7 is established by comparison of the signal (IREF+) with a current feedback signal (IFBK) via comparator U8D. Node 8 is the negative current limit control which results from an over current condition when the motor is providing negative torque while rotating with negative (reverse) velocity (motoring in the reverse direction) or when the motor is providing negative torque while rotating with positive (forward) velocity (regenerating in the forward direction). Node 8 overrides the voltage request from VREF by pulling node 12 higher via diode D9. The signal level at node 8 is established by comparison of the signal (IREF−) with the current feedback signal (IFBK) via comparator U8C. In the beginning of graph 8 of FIG. 9, node 12 is controlled by the VREF request and node 7 and node 8 are shown in off or non-controlling states. After the F/R* request toggles to the reverse direction (graph 1), node 8 begins to control node 12 as the motor velocity begins to decrease due to regenerating in the forward direction while node 7 remains in an off state. Regeneration continues until just before the motor velocity reaches zero (graph 2). From just before the motor velocity reaches zero until the motor velocity reaches the stable negative velocity, node 8 continues to control node 12 and the motor begins to increase negative velocity due to motoring in the reverse direction while node 7 remains in an off state. When the motor reaches the steady state negative velocity, node 12 again controls the PWM generation due to the VREF request while node 7 and node 8 are both in the off state. After the F/R* request toggles to the forward direction, node 7 begins to control node 12 as the motor velocity begins to degrease due to regenerating in the reverse direction while node 8 remains in an off state. Again, regenerating continues until just before the motor velocity zero. From just before the motor velocity reaches zero until the end of the graph, node 7 continues to control node 12 and the motor begins to increase positive velocity due to motoring in the forward direction while node 8 remains in an off state.

Graph 9 of FIG. 9 shows node 12, node 9, and node 6 and illustrates the generation of the node 6 signal which determines if amplifier U8A has a gain of +1 or −1 (described earlier in the current recreation explanation). Node 6 is significant in that this signal determines if amplifier U8A as a gain of +1 or a gain of −1. This node 6 signal and the amplified current through sense resistor R17 (node 3 signal) determine the quadrant in which the motor is operating. Node 9 is the PWM oscillator signal. The voltage divider set up by resistors R34, R39 and R44 sets the top and bottom limit of the sawtooth node 9 oscillator signal. The comparison of the signals at node 10 and node 11 to the oscillator signal at node 9 generates the actual PWM signal for either side of the H-bridge power transistors. In particular, when the node 10 signal exceeds the node 9 signal, a PWM forward drive signal is applied to the OUT+ side of H-bridge, and when the node 11 signal is less than the node 9 signal, a PWM reverse drive signal is applied to the OUT− side of the H-bridge. Each of the node 10 and node 11 drive reference signals are biased away from the signal at node 12 utilizing resistor pair R32 and R37 and resistor pair R45 and R54 respectively, and such biasing is set to force the generation of PWM forward and reverse drive signals around zero.

The comparison of node 12 to the oscillator generates the signal at node 6 using comparator U6A. During the first part of graph 9 of FIG. 9, while the F/R* signal (graph 1) is high, the motor is in motoring mode in the forward direction, nodes 7 and 8 are inactive (no current limit control), node 12 is above 2.5 volts—which is the zero voltage and zero current definition. Comparing node 12 to node 9, node 6 is low indicating that the motor is traveling in the forward direction with current flow in the positive direction. Immediately after the F/R* signal to node 12 goes low, the VREF signal to node 12 goes low to indicate a requested change in direction of the motor voltage which causes the signal at node 12 to also go low. With the signal at node 12 below the signal at node 9, the signal at node 6 goes high and amplifier U8A in circuit 200 has a gain of −1. The circuit falsely indicates that the motor is traveling in the reverse direction with current flow in the negative direction (false because due to inertia, the motor cannot immediately reverse). The comparison of nodes 10 and 11 to node 9 within IC U7 causes the PWM of the power transistors to reverse the voltage to the motor terminals which causes the motor to enter a reverse direction plugging condition and the motor current to build in the negative direction (even though the actual motor rotation is forward). Since the motor is in a plugging condition, the current through sense resistor R17 is positive such that the voltage at the top end of resistor R17 is positive with respect to ground. The current attempts to build a very large value such that it exceeds the IREF− signal on amplifier U8C. (Amplifier U8B amplifies the sense current to above 2.5 volts. Amplifier U8A has a gain of −1. Therefore, IFBK on amplifier U8C is below 2.5 volts.) The motor control therefore goes into current limit mode and the output at node 8 goes high (active) which pulls node 12 back to a high which causes node 6 to go low. Because node 6 is low (indicating forward actual direction) when VREF is low (indicating reverse requested direction), the circuit now correctly indicates that the motor current is in the negative direction while actual motor rotation is in the forward direction. This action also causes the motor to enter the forward direction regeneration quadrant and the H-bridge again applies a positive voltage to the motor terminals. All of this happens during the small sliver on graph 9 between the first and second PWM oscillator cycles.

The motor remains in the forward regeneration quadrant until the voltage at node 12 reaches 2.5 volts. At this point, the motor may be rotating slowly in the forward direction, but the forcing function due to the back EMF of the motor cannot maintain the desired current limit. At this point the motor enters the reverse rotation direction motoring quadrant and begins to accelerate to a steady speed in the reverse direction, and the H-bridge begins to apply a negative voltage to the motor terminals. The process of deceleration, reversal, and acceleration occurs at constant current and therefore constant torque and rate of deceleration/acceleration. As the voltage at node 12 drops just to the right of the center of graph 9, the current limit circuitry becomes inactive, the motor reaches a steady state speed, node 12 is below 2.5 volts (requesting reverse rotation), node 6 is high indicating that the motor is traveling in the reverse direction with negative current flow, and therefore the motor is in motoring mode in the reverse direction under voltage control from VREF. Immediately after the F/R* signal (graph 1) goes high in the later part of FIG. 9, the VREF signal goes high to indicate a requested change to a forward (positive) motor voltage which causes the voltage at node 12 to also go high. With the signal at node 12 above the signal at node 9, the signal at node 6 goes low and amplifier U8A has a gain of +1. The circuit falsely indicates that the motor is traveling in the forward direction with current flow in the positive direction. The comparison of nodes 10 and 11 to node 9 within IC U7 causes the PWM of the power transistors to apply a positive voltage to the motor terminals which causes the motor to enter the forward direction plugging condition and the motor current to build in the positive direction (even though the actual motor rotation is reverse). Since the motor is in a plugging condition, the current through sense resistor R17 is positive such that the voltage at the top end of the resistor is positive with respect to ground. The current attempts to build to a very large value such that it exceeds IREF+ signal on amplifier U8D. (Amplifier U8B amplifies the sense current to above 2.5 volts. Amplifier U8A has a gain of +1. Therefore, IFBK on amplifier U8D is above 2.5 volts.) The motor control goes into current limit mode and the output at node 7 goes low (active) which pulls node 12 back to a low which causes node 6 to go high. Because node 6 is high (indicating reverse actual direction) when VREF is high (indicating forward requested direction), the circuit now correctly indicates that the motor current is in the positive direction while the actual motor rotation is in the reverse direction. This action also causes the motor to enter the reverse direction regeneration quadrant and the H-bridge again applies a negative voltage to the motor terminals. All of this happens during the small sliver on graph 9 which is immediately after the F/R* signal returns to a high. The motor remains in the reverse regeneration quadrant until the voltage at node 12 reaches 2.5 volts. At this point, the motor may be rotating slowly in the reverse direction, but the forcing function due to the back EMF of the motor cannot maintain the desired current limit. At this point the motor enters the forward rotation direction motoring quadrant and begins to accelerate to a steady speed in the forward direction, and the H-bridge begins to apply a positive voltage to the motor terminals. This process of deceleration, reversal, and acceleration occurs at a constant current and therefore constant torque and rate of acceleration.

Graphs 10–12 of FIG. 9 are discussed together. Graph 10 illustrates node 9, node 10, and node 11. Node 9 and node 10 are the inputs to a comparator which generate the signal PWMREV*. Node 9 and node 11 are the inputs to a comparator which generate the signal PWMFWD*. These signals are defined such that when PWMREV* is low the power transistor output OUT− is high and when PWMFWD* is low the power transistor output OUT+ is high. Graph 11 of FIG. 9 illustrates the power transistor output OUT+ and is aligned with the comparator input signals in graph 5. Graph 12 of FIG. 9 illustrates the power transistor output OUT− and is aligned with the comparator input signals in graph 5. These three graphs follow the explanation of graph 9 exactly. A simpler description of the reversal process will be presented for these three graphs, but will attempt to follow the wording of the description of graph 4 such that the two explanations may be compared. During the first part of graph 10, while the F/R* signal (graph 1) is high, the motor is in motoring mode in the forward direction, the motor voltage is positive (OUT+ is high and OUT− is low), and the motor control is operating in voltage control mode (based upon VREF) with the current control inactive. Immediately after the F/R* signal goes low, the motor voltage reverses (OUT− is high and OUT+ is low). At this point, a forcing function equal to bus voltage plus motor back EMF is imposed across the winding resistance to cause a current flow in the negative direction. This situation causes the current to attempt to rise to a very large negative value. When the control circuitry 300 senses a large negative current, the motor negative voltage is reduced toward zero. As the motor enters a regeneration quadrant with zero voltage applied to the motor terminals, the back EMF is still applied across the winding resistance to create a negative current. Generally, the back EMF causes the motor current to exceed the requested current. Therefore, the motor control then applies a positive voltage to the motor terminals which is sufficiently less than the back EMF voltage to cause the requested negative current to flow. All of this happens during the small pulse on graph 12 which is just after the F/R* signal goes low.

Following that small pulse, the motor voltage is positive (OUT+ is high and in PWM while OUT− is low) but at a value less than prior to the direction reversal (due to PWM of OUT+). The motor remains in the forward regeneration quadrant until the OUT− signal in graph 12 begins PWM operation. During this period of forward regeneration, the PWM duty cycle of the OUT+ signal in graph 11 decreases such that the motor voltage becomes a smaller positive value. At the point where the OUT− signal begins PWM operation, the voltage applied to the motor terminals is nearly zero. At this point the motor enters the reverse rotation direction motoring quadrant and begins to accelerate to a steady speed in the reverse direction. At the point in graph 11 and graph 12 of FIG. 9 where the OUT− signal is high and the OUT+ signal is low, the motor has reached a steady state speed and is in motoring mode in the reverse direction with negative current flow under voltage control based upon the VREF signal. Immediately after the F/R* signal (graph 1) goes high in the later part of graph 1, the motor voltage changes to a positive voltage (OUT+ is high and OUT− is low). At this point, a forcing function equal to bus voltage plus motor back EMF is imposed across the winding resistance to cause a current flow in the positive direction. This situation causes the current to attempt to rise to a very large positive value. When the control circuitry 300 senses a large positive current, the motor positive voltage is reduced toward zero. As the motor enters a regeneration quadrant with zero voltage applied to the motor terminals, the back EMF is still applied across the winding resistance to create a positive current. Generally, the back EMF causes the motor current to exceed the requested current. The motor control then applies a negative voltage to the motor terminals which is sufficiently less than the back EMF voltage to cause the requested current to flow. All of this happens during the small pulse on graph 11 which is just after the F/R* goes high. Following that small pulse, the motor voltage is negative (OUT− is high and in PWM while OUT+ is low) but at a value less than prior to the direction change. The motor remains in the reverse regeneration quadrant until the OUT+ signal in graph 11 begins PWM operation. During this period of reverse regeneration, the PWM duty cycle of the OUT− signal in Graph 12 decreases such that the motor voltage becomes a small negative voltage. At the point where the OUT+ signal begins PWM operation, the voltage applied to the motor terminals is nearly zero. At this point the motor enters the forward rotation direction motoring quadrant and begins to accelerate to a steady speed in the forward direction.

Thus, the foregoing system and method allows the motor to operate in a controlled torque manner at all times and allows the power devices to be properly sized. Since a single bus current sensor is used instead of a motor current sensor, the improved operation is provided at nearly the cost of two quadrant operation. Actual motor current is recreated using bus current information.

What is claimed is:

1. A method of recreating actual motor current from sensed bus current information in a four quadrant motor, comprising the steps of:
   (a) monitoring a motor voltage magnitude request signal which varies between zero and a maximum value;
   (b) monitoring a motor direction request input;
   (c) based upon the request signal and input monitored in steps (a) and (b), establishing a voltage request reference signal which varies in magnitude between zero and a maximum reference value, the voltage request reference signal having an offset zero point such that a signal magnitude above said offset zero point represents a positive motor voltage request and a signal magnitude below said offset zero point represents a negative motor voltage request;
   (d) monitoring a current magnitude request signal which varies between zero and a maximum current request value;
   (e) establishing a first current request reference signal and a second current request reference signal based upon the signal monitored in step (d), where each of the first and second current request reference signals have a similar offset zero point and the first and second current request reference signals diverge in opposite directions from the offset zero point as the current magnitude request signal diverges from zero;
   (f) monitoring a voltage across a current sense resistor of a bus connected for powering the motor;
   (g) offsetting of the voltage monitored in step (f) to establish a sense resistor reference signal having an offset sense resistor zero point, where a signal magnitude above the offset sense resistor zero point represents a positive signal across the sense resistor and a signal magnitude below the offset sense resistor zero point represents a negative signal across the sense resistor;
   (h) comparing the first current request reference signal with a feedback current signal;
   (i) comparing the second current request reference signal with the feedback current signal;
   (j) providing the sense resistor reference signal to a controllable amplifier;
   (k) controlling a positive/negative gain of the controllable amplifier based upon the voltage request reference signal, the first current request reference signal, the second current request reference signal, and the current feedback signal; and
   (l) sampling a signal output of the controllable amplifier to generate the current feedback signal which represents the actual current of the four quadrant motor.

2. The method of claim 1, comprising the further steps of:
   (m) generating an oscillating signal;
   (n) establishing a first drive reference signal based upon at least one of the voltage request reference signal, the comparison made in step (h) and the comparison made in step (i);
   (o) establishing a second drive reference signal which is offset from the first drive reference signal by an established amount;
   (p) generating a forward motor drive signal based upon comparison of the oscillating signal with the first drive reference signal; and
   (q) generating reverse motor drive signal based upon comparison of the oscillating signal with the second drive reference signal.

3. The method of claim 2 wherein in step (m), step (n) and step (o) the relative level of the oscillating signal, the first drive reference signal, and the second drive reference signal are set to force generation of both a forward motor drive signal in step (p) and a reverse motor drive signal in step (q) when the motor velocity is around zero.

4. A method of operating a four quadrant motor, comprising the steps of:
   (a) monitoring a motor voltage magnitude request signal which varies between zero and a maximum value;
   (b) monitoring a motor direction request input;
   (c) based upon the request signal and input monitored in steps a) and (b), establishing a voltage request reference signal;
   (d) monitoring a current magnitude request signal;
   (e) establishing a first current request reference signal and a second current request reference signal based upon the signal monitored in step (d);
   (f) monitoring a voltage across a current sense resistor of a bus connected for powering the motor;
   (g) establishing a sense resistor reference signal based upon the signal monitored in step (f);
   (h) comparing the first current request reference signal with a feedback current signal;
   (i) comparing the second current request reference signal with the feedback current signal;
   (j) providing the sense resistor reference signal to a controllable amplifier;
   (k) controlling a positive/negative gain of the controllable amplifier based upon the voltage request reference signal, the comparison made in step (h) and the comparison made in step (i); and
   (l) sampling a signal output of the controllable amplifier to generate the current feedback signal which represents an actual current of the four quadrant motor.

5. The method of claim 4, comprising the further steps of:

(m) generating an oscillating signal;

(n) establishing a first drive reference signal based upon the voltage request reference signal, the comparison made in step (h) and the comparison made in step (i);

(o) establishing a second drive reference signal which is offset from the first drive reference signal by an established amount;

(p) generating a forward motor drive signal based upon comparison of the oscillating signal with the first drive reference signal; and (q) generating reverse motor drive signal based upon comparison of the oscillating signal with the second drive reference signal.

6. The method of claim 5 wherein in step (m), step (n) and step (o) the relative level of the oscillating signal, the first drive reference signal, and the second drive reference signal are set to force generation of both a forward motor drive signal in step (p) and a reverse motor drive signal in step (q) when the motor velocity is around zero.

7. The method of claim 4 wherein in step (e) each of the first and second current request reference signals have a similar offset zero point and the first and second current request reference signals diverge in opposite directions from the offset zero point as the current magnitude request signal diverges from zero.

8. The method of claim 7 wherein in step (g) the sense resistor reference signal has an offset sense resistor zero point, where a signal magnitude above the offset sense resistor zero point represents a positive signal across the sense resistor and a signal magnitude below the offset sense resistor zero point represents a negative signal across the sense resistor.

* * * * *